United States Patent [19]
Hattori

[11] Patent Number: 5,249,126
[45] Date of Patent: Sep. 28, 1993

[54] SYSTEM AND METHOD FOR CONTROLLING STEERING RESPONSE ACCORDING TO VEHICLE SPEED APPLICABLE TO AUTONOMOUS VEHICLE

[75] Inventor: Akira Hattori, Kanagawa, Japan

[73] Assignee: Nissan Motor Company, Limited, Yokohama, Japan

[21] Appl. No.: 587,944

[22] Filed: Sep. 25, 1990

[30] Foreign Application Priority Data

Sep. 27, 1989 [JP] Japan .................. 1-249313

[51] Int. Cl.$^5$ .............................. G06F 15/62
[52] U.S. Cl. .................. 364/424.02; 364/460; 395/905
[58] Field of Search .......... 364/424.01, 424.02, 364/426.04, 461, 460, 516, 517, 550, 578; 395/905, 3, 25, 85, 86, 90, 94

[56] References Cited

U.S. PATENT DOCUMENTS

| | | | |
|---|---|---|---|
| 4,809,175 | 2/1989 | Hosaka et al. | 364/424.01 |
| 4,819,169 | 4/1989 | Saitoh et al. | 364/424.02 |
| 4,862,047 | 8/1989 | Suzuki et al. | 364/424.01 X |
| 4,926,346 | 5/1990 | Yokoyama | 364/424.02 |
| 4,933,864 | 6/1990 | Evans, Jr. et al. | 364/424.01 X |
| 4,958,288 | 9/1990 | Takahashi | 364/426.04 |
| 4,970,653 | 11/1990 | Kenue | 364/461 |
| 5,005,133 | 4/1991 | Takahashi | 364/426.04 |
| 5,081,585 | 1/1992 | Kurami et al. | 364/424.02 |

Primary Examiner—Jack B. Harvey
Assistant Examiner—Edward Pipala
Attorney, Agent, or Firm—Foley & Lardner

[57] ABSTRACT

A system and method for controlling a vehicle speed according to a vehicle speed applicable to an autonomous vehicle are disclosed in which distance information and deviation of vehicle posture information are derived relative reference values. The information is derived from image data derived from photographing a road surface and is set as fuzzy sets. Membership functions constituting the fuzzy sets are varied according to vehicle speed.

4 Claims, 5 Drawing Sheets

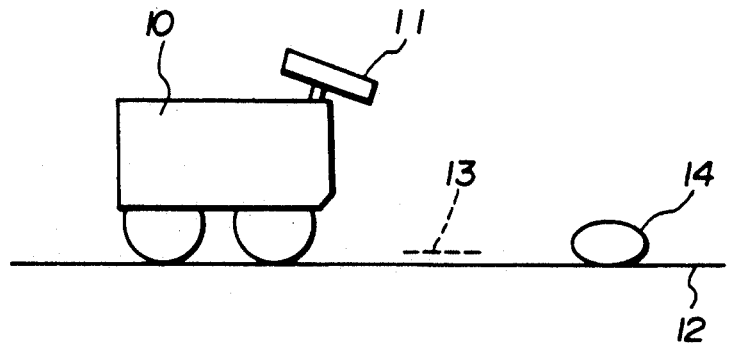
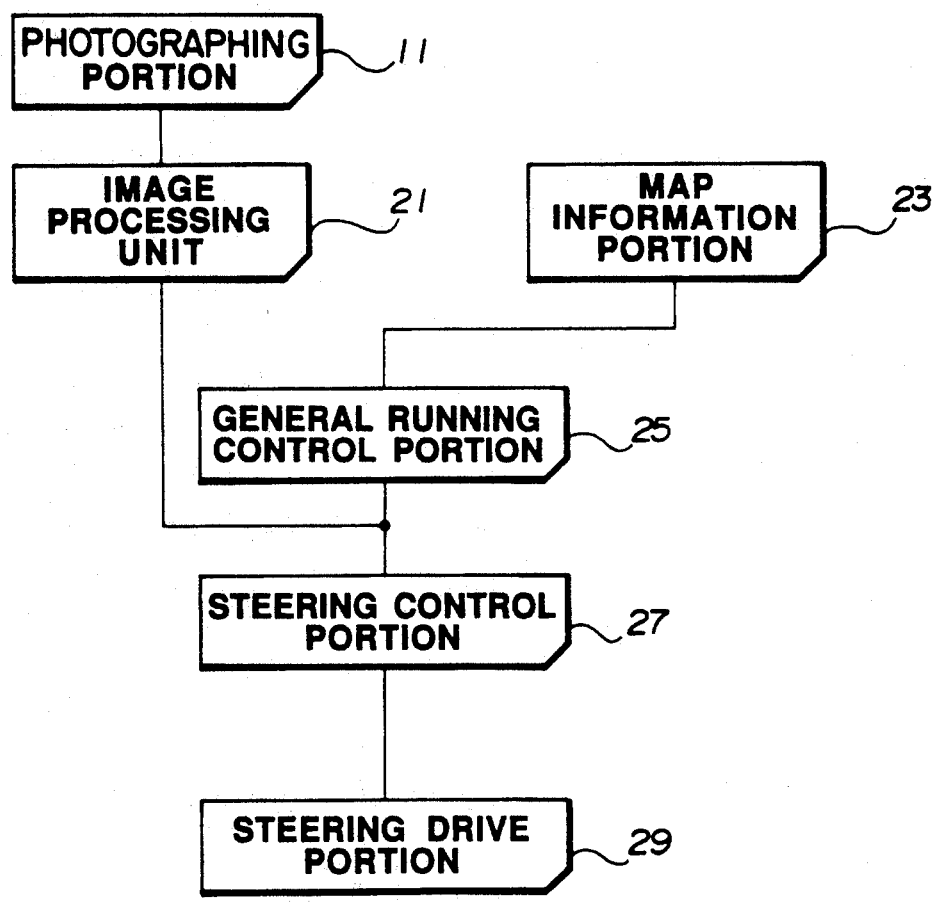

|     | -8  | -7   | -6  | -5   | -4  | -3   | -2  | -1   | 0   | 1    | 2   | 3    | 4   | 5    | 6   | 7    | 8   |
|-----|-----|------|-----|------|-----|------|-----|------|-----|------|-----|------|-----|------|-----|------|-----|
| -B  | 1.0 | 0.75 | 0.5 | 0.25 | 0   | 0    | 0   | 0    | 0   | 0    | 0   | 0    | 0   | 0    | 0   | 0    | 0   |
| -M  | 0   | 0.25 | 0.5 | 0.75 | 1.0 | 0.75 | 0.5 | 0.25 | 0   | 0    | 0   | 0    | 0   | 0    | 0   | 0    | 0   |
| S   | 0   | 0    | 0   | 0    | 0   | 0.25 | 0.5 | 0.75 | 1.0 | 0.75 | 0.5 | 0.25 | 0   | 0    | 0   | 0    | 0   |
| M   | 0   | 0    | 0   | 0    | 0   | 0    | 0   | 0    | 0   | 0.25 | 0.5 | 0.75 | 1.0 | 0.75 | 0.5 | 0.25 | 0   |
| B   | 0   | 0    | 0   | 0    | 0   | 0    | 0   | 0    | 0   | 0    | 0   | 0    | 0   | 0    | 0   | 0    | 1.0 |

| $S(x,\theta)$ | | ΔX | | | | |
|---|---|---|---|---|---|---|
| | | -B | -M | S | M | B |
| Δθ | -B | 10 | 6 | 4 | 2 | 0 |
| | -M | 6 | 3 | 1 | 0 | -1 |
| | S | 3 | 1 | 0 | -1 | -3 |
| | M | 1 | 0 | -1 | -3 | -6 |
| | B | 0 | -2 | -4 | -6 | -10 |

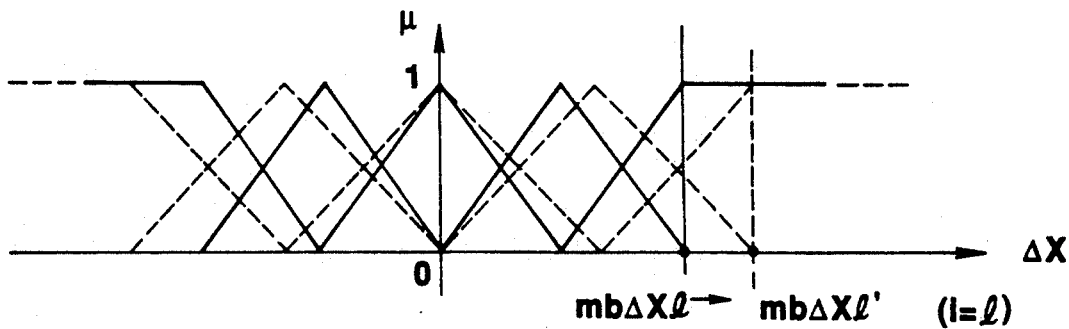
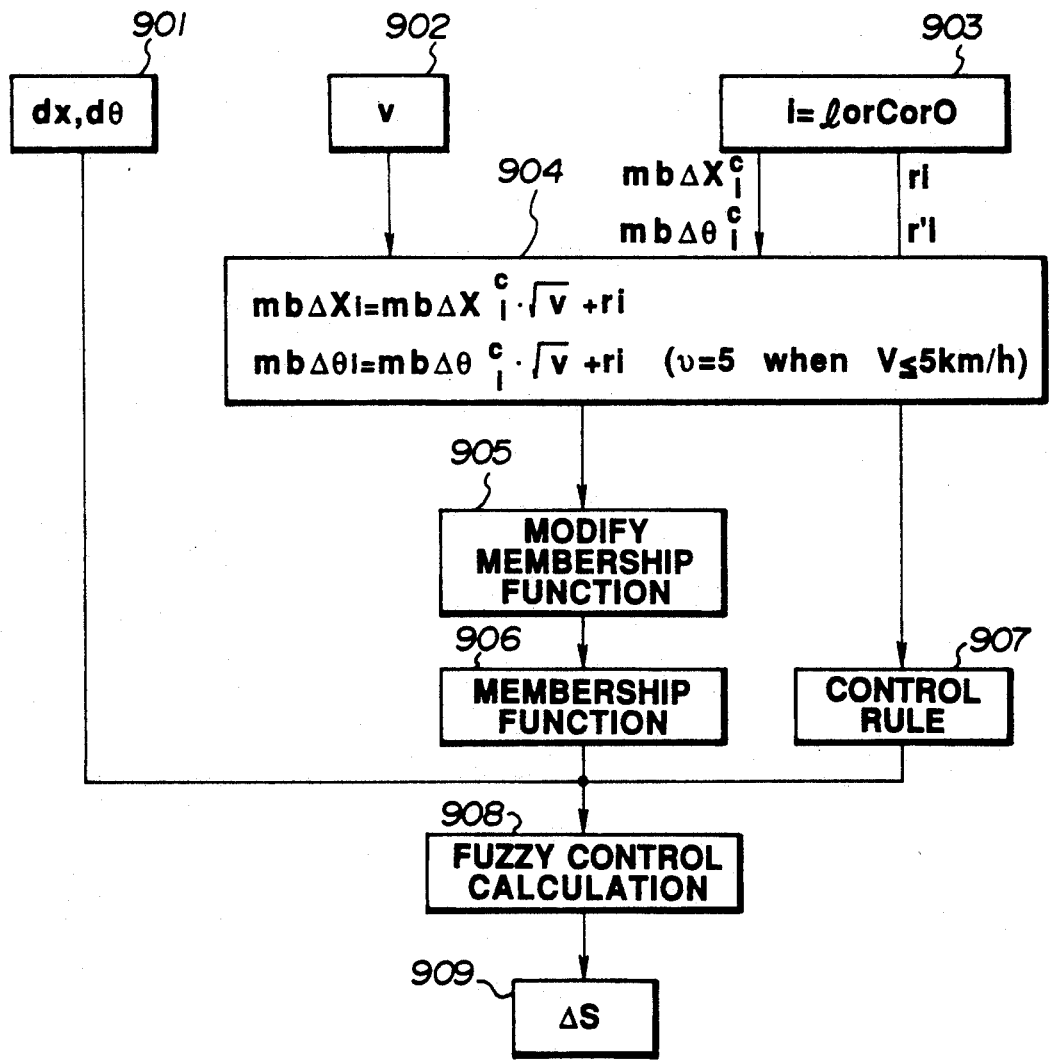

SYSTEM AND METHOD FOR CONTROLLING STEERING RESPONSE ACCORDING TO VEHICLE SPEED APPLICABLE TO AUTONOMOUS VEHICLE

BACKGROUND OF THE INVENTION (1) Field of the Invention

The present invention relates to a system and method applicable to an autonomous vehicle for autonomously controlling steering response according to vehicle speed.

(2) Background Art

U.S. patent applications Ser. No. 337,707 and No. 485,910 filed on Apr. 13, 1989 and Feb. 27, 1990 respectively, exemplify structures of autonomous vehicles.

In previously proposed vehicle speed sensitive steering response control systems, a driving control response model for a vehicle, based on a mathematical model 'driver' virtually emulating a human driver, includes: a "linear feedback correction steering model" which detects relative distance between a lateral position of the autonomous vehicle and a detected width of its running path and a posture angle based on the posture of the vehicle relative to its running path and adjusts the steering response according to the detected information; a "predictive control model" which predicts the future position of the vehicle 'L' meters ahead, according to the current posture angle; "optimum control model" which maximizes or minimizes a set evaluation function, i.e., changes the control response according to a vehicle characteristic when the evaluation function is set. The validities of all control models are established through experimentation.

Since in previously proposed vehicle-speed dependent steering response control apparatuses proportional constants for adjusting the steering angle are arbitrarily set, disadvantages in terms of both vehicle stability and follow-up characteristics are created, as no sufficient adjustment thereof is carried out while the vehicle is in motion. In cases where these models have been applied to autonomously running vehicles with the vehicle speed being variable, means for determining optimum proportional constants both in terms of stability and follow-up characteristics has not been defined. Therefore, these models are effective only in a case where the vehicle cruises at a substantially constant speed.

SUMMARY OF THE INVENTION

It is an object of the present invention to provide a system and method for controlling steering response applicable to an autonomous vehicle which can achieve high steering stability even though vehicle speed is varied.

The above-described object can be achieved by providing a system for controlling steering response according to vehicle speed applicable to an autonomous vehicle, comprising: a) first means for photographing a road surface along which the autonomous vehicle runs; b) second means for detecting the vehicle speed; c) third means for setting distance information on the autonomous vehicle derived from image data of the first means and deviation of vehicle posture along a road surface with respect to a reference value as fuzzy sets; and d) fourth means for modifying membership functions constituting the fuzzy sets according to vehicle speed to vary the fuzzy sets to determine a steering angle of the autonomous vehicle.

The above-described object can also be achieved by providing a system for controlling steering displacement of an autonomous vehicle, comprising: a) first means for generating data on a vehicle running condition, the data including the distance to a position of reference along a line of vehicle motion at a predetermined distance ahead of the vehicle and a tangential angle between a guide line on a road surface and the line of vehicle motion; b) second means for detecting the vehicle speed; c) third means for storing reference membership functions and fuzzy control rules; e) fourth means for varying parameters in the reference types of control rules according to vehicle speed to modify the membership functions, inputting the data in the modified membership functions, and inputting the derived membership values into the control rules; and f) fifth means for deriving the steering angle according to the values derived from the control rules and steering the vehicle accordingly.

The above-described object can also be achieved by providing a method for controlling steering response according to vehicle speed applicable to an autonomous vehicle, comprising the steps of a) photographing a surface along which the autonomous vehicle runs; b) detecting the vehicle speed; c) setting distance information on the autonomous vehicle derived from image data at the step a) and deviation of vehicle posture along the surface with respect to a reference value as fuzzy sets; and d) modifying membership functions constituting the fuzzy sets according to the vehicle speed to vary the fuzzy sets to determine a steering angle of the autonomous vehicle.

BRIEF DESCRIPTION OF THE DRAWINGS

FIG. 1 is a schematic drawing of an autonomous vehicle to which the present invention is applicable.

FIG. 2 is a circuit block diagram of a preferred embodiment of a steering response controlling system according to the present invention.

FIG. 8 is an explanatory view of enlarging a dead zone width with respect to an input variable in steering response at a high vehicle speed.

FIG. 9 is a response flowchart explaining an operation of the steering response controlling system in a case such as shown in FIG. 8.

DETAILED DESCRIPTION OF THE PREFERRED EMBODIMENT

Figure 3:
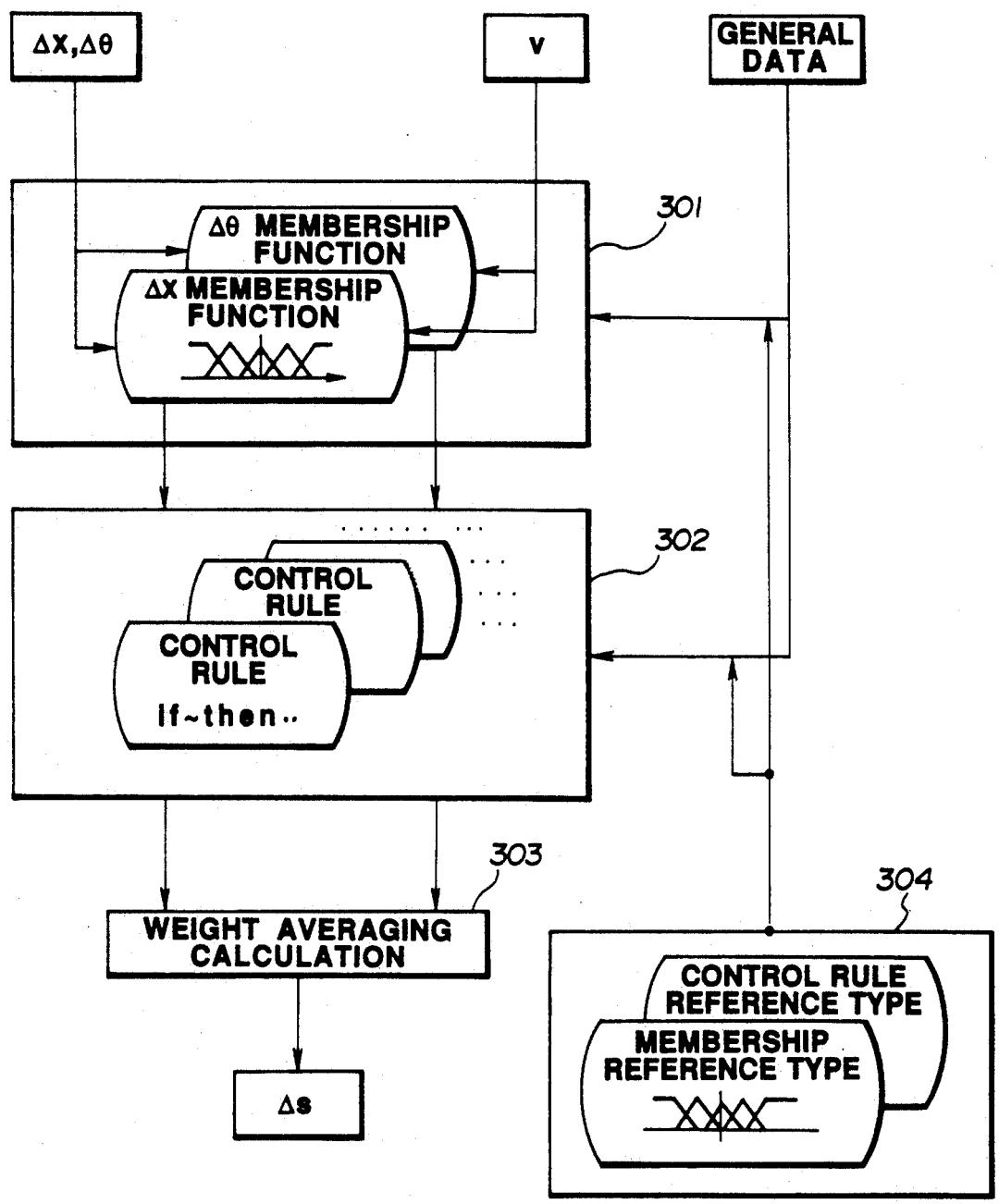
FIG. 3 is a response flowchart executed by the steering response controlling system in the preferred embodiment shown in FIG. 2.

Reference will hereinafter be made to the drawings in order to facilitate a better understanding of the present invention.

FIG. 1 shows an autonomously running vehicle (hereinafter, also referred to as an autonomous vehicle) to which a system for controlling steering response according to the vehicle speed variation is applicable.

In FIG. 1, a photographing portion 11 is installed on a vehicle body 10. A white line 13, i.e., a guide line depicted on each side of a road surface, and obstacle 14 are photographed at a predetermined control period and the vehicle body 10 runs autonomously on the path along the white line 13.

A structure of the autonomous vehicle is exemplified by U.S. patent applications Ser. Nos. 337,707 and 485,910 filed on Apr. 13, 1989 and on Feb. 27, 1990, respectively. Both of these disclosures are hereby incorporated by reference.

FIG. 2 shows a circuit block diagram of the steering response control system of the preferred embodiment.

The steering response control system includes: an image processing portion 21 for deriving image data, receiving photographic data signals of, for example, white lines of a road surface, photographed by the photographing portion 11 (camera) and detecting positional coordinates of the white lines and an angle at which a longitudinal line, projected along the path of vehicle travel, intersects any one of the detected white lines; a map information portion 23 storing a node path information on the running path 12; a general running control portion 25 which determines path information to be run; a steering response control portion 27 which determines the steering angle from information derived from the image processing portion 21, map information portion 23, and the general running control portion 25; and a steering drive portion 29 which drives an actuator on the basis of the steering angle determined by the steering response controlling portion 27.

FIG. 3 shows an operational flowchart executed by the steering response control system shown in FIG. 2.

The steering response control system, according to FIG. 3, basically derives a steering output deviation S from input image data ($\Delta x$, $\Delta \theta$). The image information includes: a) deviation of the vehicle posture with respect to a reference line as will be described below; and b) a vehicle posture of $\Delta \theta$ of a tangential point with respect to a white line 13 in a forward direction.

Figure 7:
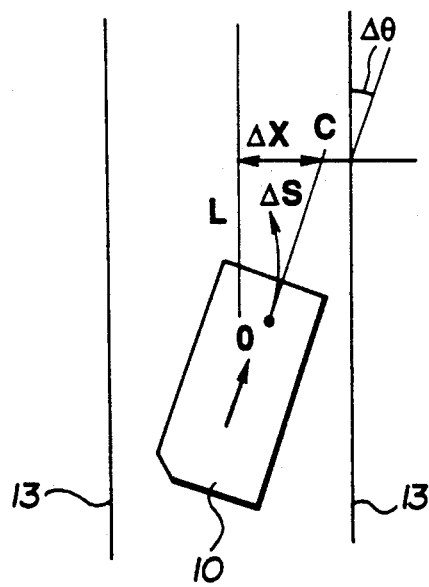
FIG. 7 is an explanatory view of a deviation x with respect to a vehicle motion center and the vehicle's posture.

The input image data $\Delta x$ and $\Delta \theta$ are defined as shown in FIG. 7. That is to say, in a case where the camera 11 photographs the white line in front of the vehicle, the data is derived for a position 'L' meters ahead of a motion center O of the vehicle 10. The data $\Delta x$ denotes the positional deviation of the vehicle motion center from the running reference line set in the general running control portion 25 and $\Delta \theta$ denotes the tangential angle in the vehicle forward direction with respect to the white line.

Referring to FIG. 3, the image data $\Delta x$ and $\Delta \theta$ are input to input variable portions of membership functions of fuzzy sets previously set and the reliability of the input, i.e., membership values, is derived.

After the membership values are derived, each of them is compared with one of the membership values of the input variables in the input portion of if the "if" side in the following control rule: if $\Delta x$ is x and $\Delta \theta$ is T then $\Delta S = S (X, T)$ (X and T denote fuzzy sets and S denotes a real number). Then each of the lower values of the membership values compared with each other is multiplied with the output values of the "then" side of the above control rule (step 301 in FIG. 3).

The multiplied value is defined as an output value of the control rule. The multiplication described above is carried out for all control rules (step 302 in FIG. 3).

Then, a weight mean calculation is carried out as in the following equation (step 303 in FIG. 3).

$$\Delta S = \frac{\sum_T \sum_X \{\min (\mu(\Delta \chi), \mu(\Delta \theta)) \cdot S(\chi, T)\}}{\sum_T \sum_X \min (\mu(\Delta \chi), \mu(\Delta \theta))}$$

It is noted that a reference type of each of the membership functions and control rules is previously set as in a step 304 in FIG. 3.

Figures 4, 5:
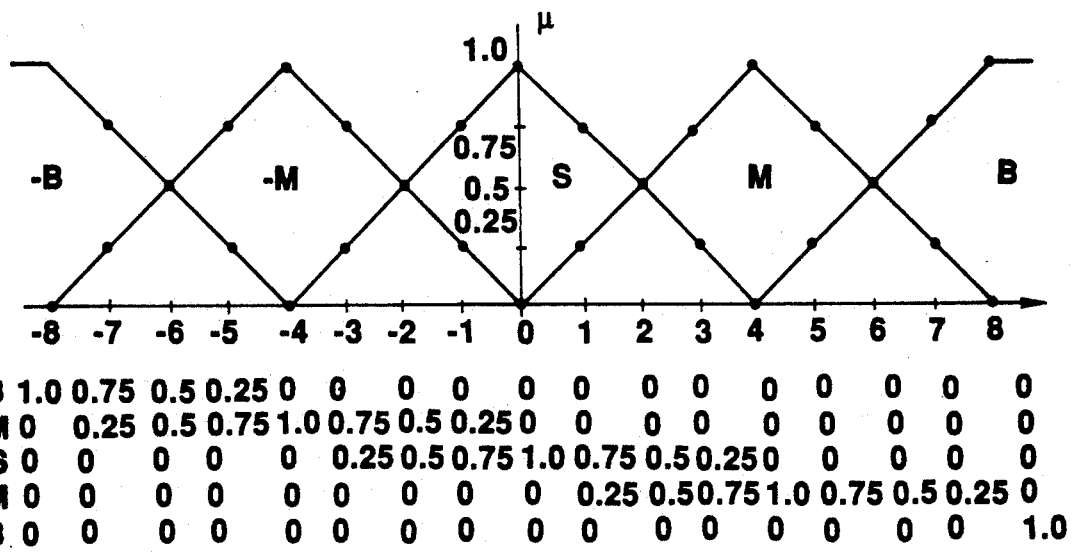
FIG. 4 is an explanatory view of membership functions used and stored in the preferred embodiment shown in FIG. 2.
FIG. 5 is an explanatory view of control rules used and stored in the preferred embodiment shown in FIG. 2.

Specifically, the membership functions are stored in a computer in the form of array of discrete values of the fuzzy sets as shown in FIG. 4.

In addition, each control rule is specifically stored into the computer in a table form for each of the sets of $\Delta x$ and $\Delta \theta$, as shown in FIG. 5, the output steering angle being in the form of a real number. Each of the control rules is, e.g., "if $\Delta x$ is slightly large in the positive direction (M) and $\Delta \theta$ is large in the positive direction (B), force the steering angle to steer $-6$ degrees (if $\Delta x$ is X and $\Delta \theta$ is T then $\Delta S = S (X, T)$)".

It is also noted that the general data in FIG. 3 defines the present running path, i.e., that the running path is a straight road (l), curved road (C), or an obstacle evasion manuver (O).

$mb\Delta xl$, $mb\Delta xc$, $mb \Delta xo$, $mb\Delta \theta l$, $mb\Delta \theta c$, and $mb\Delta \theta o$ are parameters for the membership reference types and rl, rc, and ro are parameters for the control rules. They allow infinite variation of the reference types.

Figure 6:
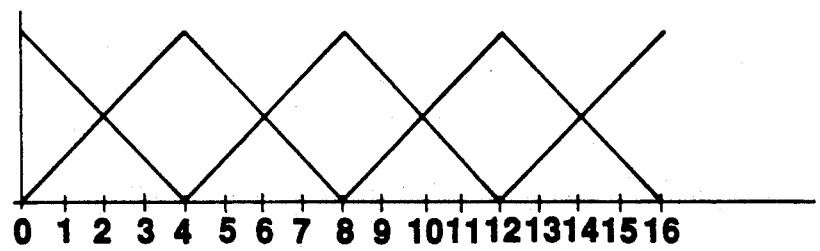
FIG. 6 is an explanatory view of normalization of an input variable in one of the membership functions.

That is to say, the input variables of FIG. 4 can be normalized to values of 0 through 16 as shown in FIG. 6. Therefore, if the input variables during the vehicle run on the straight road are, for example, $\Delta xo$, $\Delta \theta o$ ($\Delta x$, $\Delta \theta$) can be handled as the values of 0 through 16 as appreciated from the following equations:

$$\Delta xo = 8 \cdot (\Delta xo + mb\Delta x)/mb\Delta x$$

$$\Delta \theta o = 8 \cdot (\Delta \theta o + mb\Delta \theta)/mb\Delta \theta$$

For the control rules, output portions of the control rules, i.e., S (X, T) are multiplied by coefficients according to the running situations and handled as the values derived from $S (X, T) = S (X, T) \cdot rl$.

In addition, steering control can be carried out using the same membership functions in the case where the vehicle speed is low, e.g., below 5 Km/h. As the vehicle speed becomes high, steering stability is lowered and a reference line following characteristic becomes worse so that the vehicle tends to zig-zag.

Hence, the parameters $mb\Delta xi$, $mb\Delta \theta i$ (i=l, o, c) for the above membership reference types are varied by means of functions which are proportional to a square of the vehicle speed, respectively. The functions to vary them are $mb\Delta x^i = mb\ x_i{}^c \cdot \sqrt{v + r_1}$ and $mb\Delta \theta_i = mb\Delta \theta_i{}^c \cdot \sqrt{v + r_i'}$ (i=l, o, c, v denotes the vehicle speed, $mb\Delta x_i{}^c$, $mb\Delta \theta_i{}^c$, $r_i$, and $r_i'$ denotes constants).

This variation is followed by the change in the membership functions so that a dead zone in the input values is enlarged as the vehicle speed is increased.

That is to say, as shown in FIG. 8, when $mb\Delta x$ value for the instantaneous vehicle speed is $mb\Delta xl$, the vehicle speed is increased so as to provide $mb\Delta xl'$ ($> mb\Delta xl$), thus completely enlarging each membership function.

FIG. 9 shows an operational flow of the above-described series of processings.

In step 901, $\Delta x$ and $\Delta \theta$ are input which indicate running conditions derived through the processing by the image processing portion 21 based on the data input from the camera 11.

In steps 902, 903, and 904, the vehicle speed v and one of the running situations i (=l, c, or o, i.e., straight running, curved road running, or obstacle avoidance running) are input and the parameters for the membership functions are modified on the basis of the input values as a function which is proportional to the square of the vehicle speed. Thereafter, the membership functions are modified in step 905. Fuzzy control calculation is carried out on the basis of the membership functions and control rules in steps 906 through 908. In step 909, the steering output deviation $\Delta S$ is then calculated.

As described hereinabove, since, in the system for controlling steering response of a vehicle during the change in speed and method therefor according to the present invention, the distance information derived from the image data photographed on a running path of the vehicle and the deviation of the vehicle posture from the reference value are set as fuzzy sets and the steering angle of the vehicle is determined with the membership functions constituted by the fuzzy sets which are modified according to the vehicle speed, high steering stability can be achieved even if the vehicle speed is changed adjusting the membership functions. Consequently, appropriate steering control for an autonomously running vehicle, the speed of which is variable, can be carried out.

It will fully be appreciated by those skilled in the art that the foregoing description is made in terms of the preferred embodiment and various changes and modifications may be made without departing from the scope of the present invention which is to be defined by the appended claims.

What is claimed is:

1. A system for controlling a steering displacement of an autonomous vehicle, comprising:
    first means for generating data on a vehicle running condition, the data including a distance to a position of reference along a line of vehicle motion at a predetermined distance ahead of the vehicle and a tangential angle between a guide line on a road surface and said line of vehicle motion;
    second means for detecting a vehicle speed;
    third means for storing reference membership functions and fuzzy control rules;
    fourth means for varying parameters in the reference types of control rules according to the vehicle speed to modify the membership functions, inputting the data in the modified membership functions, and inputting the derived membership values into the control rules; and
    fifth means for deriving a steering angle deviation S according to the values derived from the control rules and steering the vehicle accordingly, wherein the first means generates data on a running situation, meaning, data indicating any one of, straight road running (l), curved road running (c), or running so as to avoid an obstacle (o) and wherein the fourth means varies parameters of the reference membership functions as a function of a square root of the vehicle speed on the basis of the data of the running situation, meaning, any one of the straight running road, curved road running, or running so as to avoid an obstacle.

2. A system as set forth in claim 1, wherein input values of the membership functions are set as follows:

$$\Delta x_o = 8 \cdot (\Delta x_o + mb\Delta x)/mb\Delta x,$$

$$\Delta \theta_o = 8 \cdot (\Delta \theta + mb\Delta \theta)/mb\Delta \theta$$

(wherein $mb\Delta x$, $mb\Delta \theta$ denote parameters of the reference membership fuctions for the running situation data, straight running, curved road running, or obstacle avoidance, respectively, and $\Delta x$, $\Delta \theta$ denote normalized input values of the membership functions on distance and tangential angle, respectively, and the output values S (X, T) of the control rules are multiplied by parameters rl, rc, or ro determined according to straight road, curved road, or obstacle avoidance running as follows: S (X, T) = S (X. T)·rl (or rc or ro).

3. A system as set forth in 2, wherein the parameters of the reference membership functions are varied as follows:

$$mb\Delta x_i (i = \chi, c, \text{ or } o) = mb\Delta x_i^c \cdot \sqrt{v} + r_i$$

$$mb\Delta \theta_i = mb\Delta \theta_i^c \cdot \sqrt{v} + r_i'.$$

wherein v denotes the vehicle speed, $mb\Delta x_i^c$, $r_i$, $r_i'$, and $mb\Delta \theta_i^c$ denote constants.

4. A system as set forth in claim 3, wherein v=5 Km/h when the vehicle speed v is equal to or less than 5 Km/h.

* * * * *